United States Patent
Haley

(10) Patent No.: US 7,519,678 B1
(45) Date of Patent: Apr. 14, 2009

(54) INTERNET MESSAGING NOTIFICATION METHODS AND SYSTEMS

(75) Inventor: James Edward Haley, Aston, PA (US)

(73) Assignee: Verizon Laboratories, Inc., Waltham, MA (US)

(*) Notice: Subject to any disclaimer, the term of this patent is extended or adjusted under 35 U.S.C. 154(b) by 913 days.

(21) Appl. No.: 10/302,404

(22) Filed: Nov. 22, 2002

(51) Int. Cl.
*G06F 15/16* (2006.01)

(52) U.S. Cl. .................. 709/217; 709/203; 709/227

(58) Field of Classification Search ......... 455/403–415, 455/426.2, 3; 709/203, 217, 227
See application file for complete search history.

(56) References Cited

U.S. PATENT DOCUMENTS

| | | | |
|---|---|---|---|
| 6,449,493 B1 * | 9/2002 | Webster et al. ........... 455/550.1 |
| 6,560,456 B1 * | 5/2003 | Lohtia et al. ............... 455/445 |
| 6,714,635 B1 * | 3/2004 | Adams et al. .......... 379/204.01 |
| 6,735,285 B2 * | 5/2004 | Orwick et al. ................ 379/37 |
| 6,757,531 B1 * | 6/2004 | Haaramo et al. ......... 455/414.1 |
| 6,990,472 B2 * | 1/2006 | Rosenhaft et al. .......... 455/3.03 |
| 2002/0118812 A1 * | 8/2002 | Contractor ............. 379/220.01 |
| 2004/0096042 A1 * | 5/2004 | Orwick et al. ................ 379/45 |

\* cited by examiner

*Primary Examiner*—Phuoc Nguyen

(57) ABSTRACT

The disclosed methods and systems can employ internet messaging protocols to transmit an alphanumeric message to one or more destination addresses in response to a telephone service customer's notification service request. The request can include a string having a feature code trigger and one or more digits. The destination address can be an electronic mail address, an instant messaging address, a pager number, and/or a telephone number.

16 Claims, 2 Drawing Sheets

INTERNET MESSAGING NOTIFICATION METHODS AND SYSTEMS

FIELD

The disclosed methods and systems relate to communications systems and more particularly, to internet messaging notification methods and systems.

BACKGROUND

Various systems and methodologies have been proposed for automatic or semi-automatic dissemination and distribution of a message to a designated list or other group of individuals. Some of these systems have been designed for specific purposes such as emergency or alarm-type notifications, and may be activated from a touch-tone telephone using a caller's pass code. When the caller's identity has been verified, one system requests a list of individuals to be notified by telephone or pager, and the caller may choose a prerecorded message or record a new message for transmission to the list of individuals. The system then accesses the telephone and/or pager numbers associated with the list of individuals and commences a calling cycle. Natural disasters, unusual demand and human error can impact telephone service availability and hence can thwart the effectiveness of such systems. During such extreme conditions, the telephone network capacity may be disrupted such that the emergency or alarm-type notifications may not be completed by the system.

SUMMARY

The disclosed methods and systems include a method for receiving a request from a telephone service customer, and transmitting an alphanumeric message to at least one destination address using internet messaging protocols based on the request and customer data associated with the request. The request can include a string having a feature code trigger and one or more digits, where the feature code trigger can be a single star (*), double star (**), a pound (#), and/or a double pound (##). The destination address can be an electronic mail address, an instant messaging address, a pager number, and/or a telephone number. The internet messaging protocol can be a simple mail transport protocol (SMTP), an internet messaging and presence protocol (IMPP), a simple network paging protocol (SNPP), a transmission control protocol/internet protocol (TCP/IP), a protocol specified by a Telcordia Technologies SR-3511 standard, and/or a protocol specified by a Telcordia Technologies SR-3389 standard.

The disclosed methods and systems can associate strings with call processing services, such as a group notification service. Transmitting the alphanumeric message can include determining that the received string is associated with a group notification service request. The disclosed methods and systems can receive one or more messages and one or more destination addresses from the telephone service customer via a user interface, associate the messages with the one or more destination addresses, and store the messages and the associated destination addresses as customer data. The customer data can include a customer identifier, a password, a list of call processing services to which the customer is subscribed, one or more alphanumeric messages, and/or one or more destination addresses.

The disclosed methods and systems can include an apparatus that has a user interface for receiving a request from a telephone service customer, the request including a string having a feature code trigger and one or more digits, and a processor for processing the request and customer data associated with the request and transmitting an alphanumeric message to at least one destination address using internet messaging protocols. The apparatus can also include a memory for storing customer data on a plurality of telephone service customers, and a memory for storing a call processing record which associates feature codes with call processing services of a telephone service.

The disclosed methods and systems can include a service switching point having means for receiving a request from a telephone service customer, means for communicating the customer request to a service control point, means for receiving instructions from the service control point, and means for transmitting an alphanumeric message to at least one destination address using internet messaging protocols based on the instructions received from the service control point. The customer request can include a string having a feature code trigger and one or more digits.

The disclosed methods and systems can include a service control point having means for receiving data from a service switching point, means for processing the data to determine whether the data includes a group notification service request, and means for instructing the service switching point to transmit an alphanumeric message to at least one destination address using internet messaging protocols based on the group notification service request and customer data associated with the group notification service request. The service control point can also include means for storing customer data on a plurality of telephone service customers, and means for storing a call processing record which associates feature codes with call processing services of a telephone service.

The disclosed methods and systems include a computer program product disposed on a computer readable medium and having instructions for causing a processor to receive a request from a telephone service customer, the request including a string having a feature code trigger and one or more digits, and based on the request and customer data associated with the request, transmit an alphanumeric message to at least one destination address using internet messaging protocols.

Other objects and advantages will become apparent hereinafter in view of the specification and drawings.

DETAILED DESCRIPTION

Figure 1:
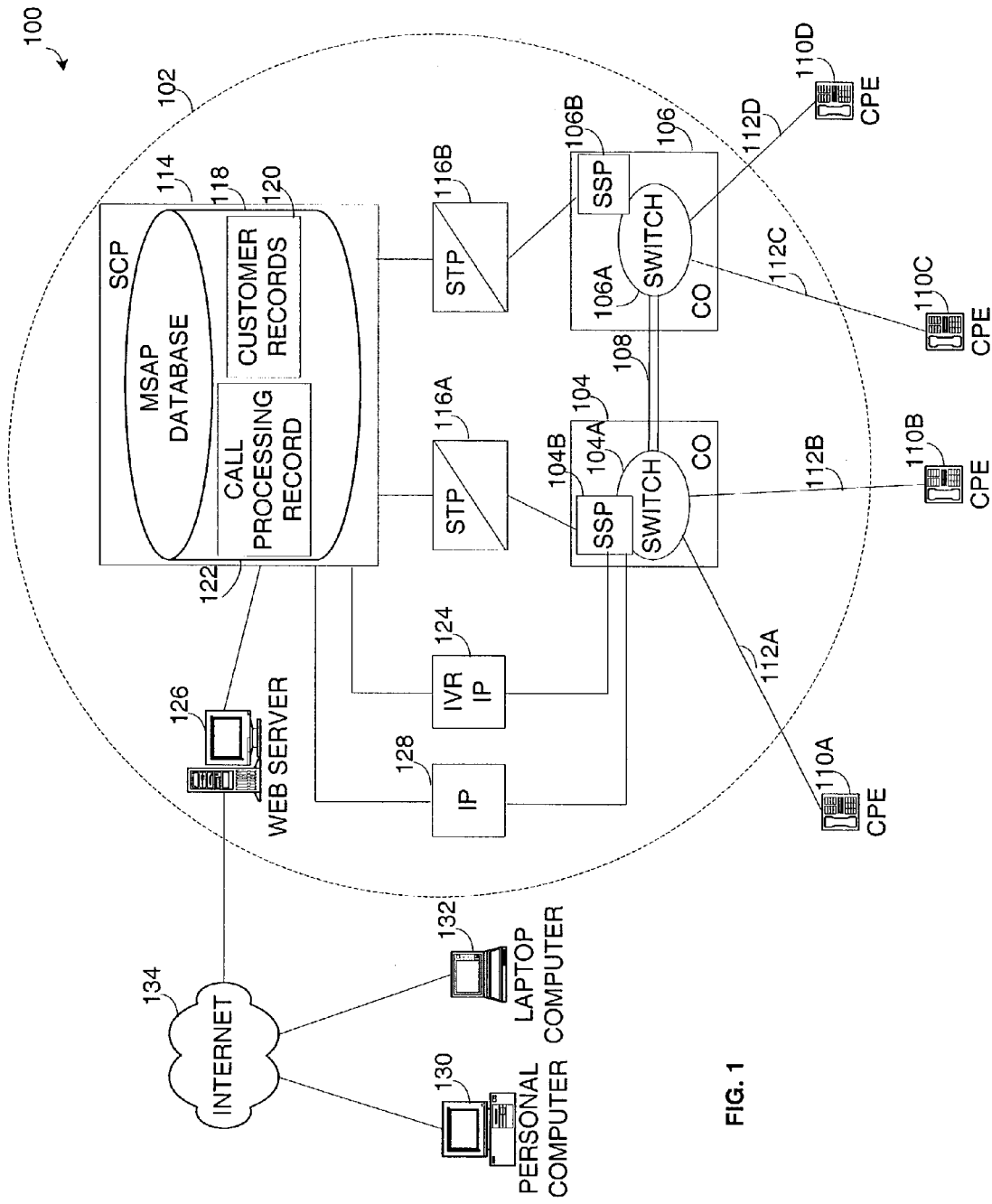
FIG. 1 is a block diagram of a communications system integrated with a public switched telephone network.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

For the described methods and systems, a processor can be understood to be a processor-controlled device that can include, for example, a PC, workstation, handheld, palm, laptop, cellular telephone, or other processor-controlled device that includes instructions for causing the processor to act in accordance with the disclosed methods and systems. References to "a processor" or "the processor" can be understood to include one or more processors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application.

An illustrative embodiment will be discussed in the context of a public switched telephone network including a local exchange carrier. It is understood that such a discussion is not to be taken as a limitation, since the systems and methods may be practiced with different types of telecommunications systems, for example, a private telecommunications network.

The disclosed methods and systems can employ internet messaging protocols to transmit an alphanumeric message to one or more destination addresses in response to a telephone service customer's notification service request. Although the discussion herein employs the term "group," a group can include one or more destination addresses.

Figure 2:
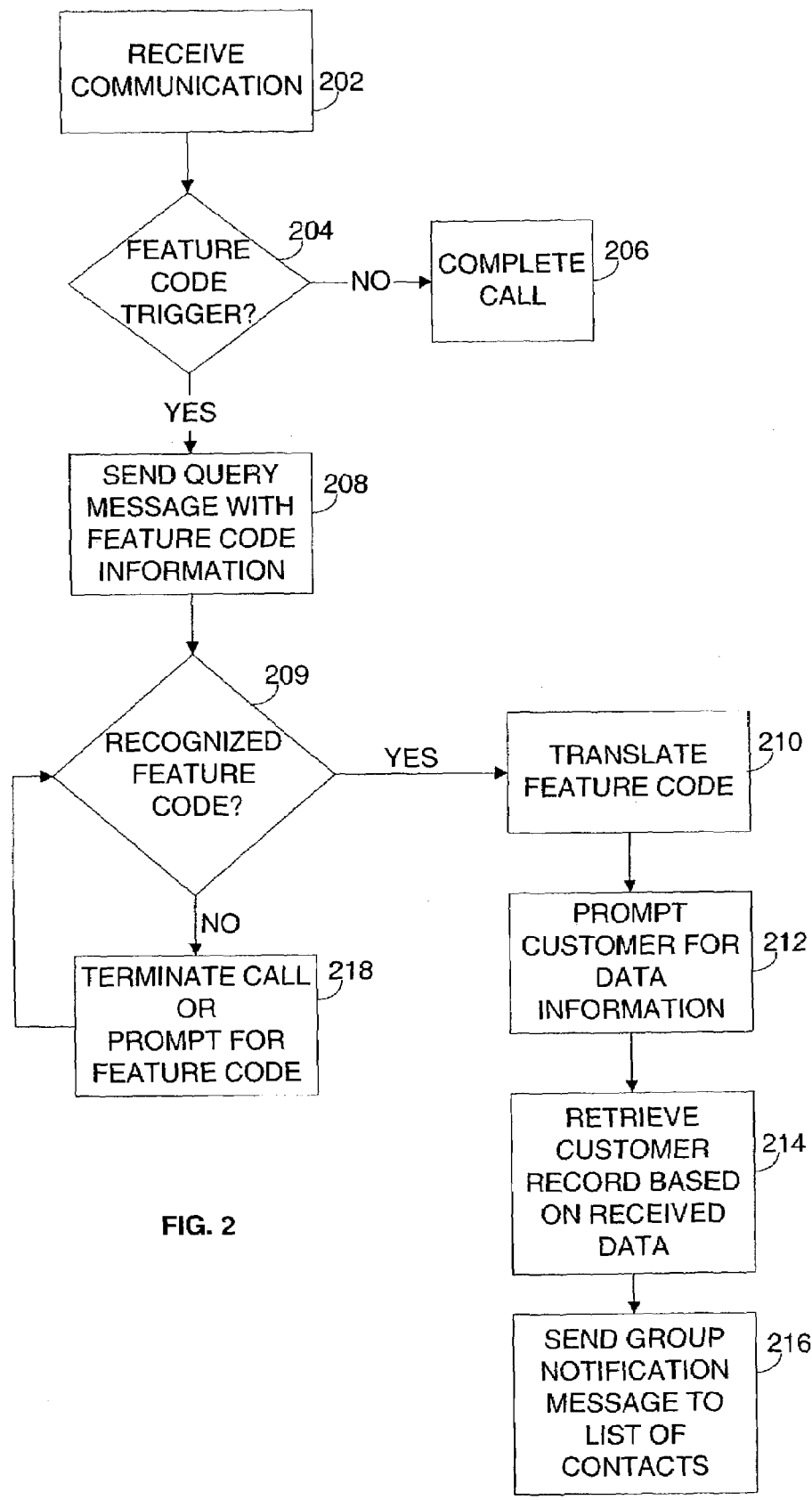
FIG. 2 is a flow chart of a process for providing a group notification service.

Referring to FIG. 1, an exemplary system 100 includes an Advanced Intelligent Network (AIN) 102 integrated with a public switched telephone network (PSTN) to provide call processing features and services although such system 100 is merely one illustrative embodiment for practicing the disclosed methods and systems that are more generally depicted by FIG. 2. One call processing service is a group notification service, described in more detail below, that facilitates the transmission of an alphanumeric message to a designated list or group of destination addresses. For the purposes of the disclosed methods and systems, a message can be understood to be at least one of a page, a short message service (SMS) message, an instant message, and an e-mail, and a destination address can be understood to be at least one of a pager number, a telephone number, an instant messaging address, and an e-mail address.

For a system according to FIG. 1, the AIN 102 may be used by a Local Exchange Carrier (LEC) servicing a Local Access and Transport Area (LATA) of the PSTN. The LEC can have one or more central offices 104 and 106 that include switches 104a and 106a which, combined with the cables and other transmission media, form a network of the LEC. The central office switches 104a and 106a can be interconnected by trunk lines 108, which may be implemented using, for example, fiber optic cables although other wired or wireless transmission media can be used to effectuate the transmission of signals. The central office switches 104a and 106a can be connected to one or more customer premises equipments (CPEs) 110a-d, which can include residential telephones, business telephones, cellular telephones, payphones, two-way paging devices, and other wired and/or wireless devices that can access the LEC. Connections between the central office switches 104a and 106a and the CPEs 110a-d may be by plain old telephone service (POTS) lines, integrated services digital network (ISDN) lines, digital subscriber lines (DSL), and/or other wired and/or wireless communications lines, collectively referred to herein as "customer lines" 112a-d.

The central office switches 104a and 106a can be associated with Service Switching Points (SSPs) 104b and 106b implemented, for example, using Class V telecommunications switches capable of supporting the Signaling System Seven (SS7) protocol. The SSPs 104b and 106b can include call control software and intelligent network (IN) software to separate basic calls from feature code calls when the calls arrive at the SSPs 104b and 106b. Feature code calls generally include triggers that can be set such that, for example, when a SSP 104b, 106b receives a string that includes a star (*), double star (**), a pound (#), a double pound (##), or other designated string, the trigger can be activated. Upon activation, the SSP 104b, 106b can temporarily suspend call processing and initiate communications with a Service Control Point (SCP) 114 via a Signal Transfer Point (STP) 116a, 116b using for example SS7, to determine how the SSP 104b, 106b should process the call.

The SCP 114 can be a database server and/or an application server, where a server can be understood herein to be a processor-controlled device having a processor with instructions for causing the processor to act in accordance with the methods and systems. For example, in one implementation, the SCP 114 includes a real-time multi-service application platform (MSAP) database 118 which can store customer records 120 and/or call processing records 122. A customer record 120 can include at least one of a customer identifier, a list or group of call processing services to which a customer subscribes, and a password which may be input via dual-tone multi-frequency (DTMF) signals although other data can be included. Examples of call processing services which may be supported by the SCP 114 include group notification, call routing, call forwarding, call screening, caller ID, and voice dialing. Call processing record data can be used by an SSP 104b or 106b to process a feature code call in accordance with a service to which a customer subscribes. In one implementation, the call processing record 122 includes a lookup table that associates feature codes with call processing services, but other associative methods can be used without departing from the scope of the disclosed methods and systems.

When a customer places a feature code call by dialing *38, for example, the SCP 114 can access a call processing record 122 to determine whether there is an entry in the lookup table that includes or is otherwise associated with the feature code represented by the string "*38". If such an association exists, the SCP 114 can return instructions to the SSP 104b and/or 106b for the call processing service associated with the *38 feature code. If the lookup operation yields a negative result (i.e., no entry that includes or is associated with the feature code represented by the string "*38"), the SCP 114 can transmit a call signal to the SSP 104b and/or 106b to terminate the call, or, the SCP 114 can transmit one or more instructions to the SSP 104b and/or 106b to cause the SSP 104b and/or 106b to prompt the customer to enter a feature code.

Customer records 120 can be generated, at least initially, by a LEC service representative or operator. However, the customer records 120 can be updated by the customer by telephone or via the Internet. For example, the illustrated system 100 includes an interactive voice response intelligent peripheral (IVR IP) 124 to facilitate SSP 104b, 106b features that can include speech recognition and DTMF signal detection operations, as well as playing voice prompts and other messages. The IVR IP 124 can serve as a platform by which a customer can update a customer record through a telephone by dialing a telephone number associated with the IVR IP 124 and establishing a voice/DTMF connection. The IVR IP 124 can include one or more security features, for example, customer identification (e.g., user name, account number) and password entry.

The illustrated system 100 also includes a web server 126 that can be a secure gateway through which customers can access and update customer records using a data communications device having web browsing capabilities. The data communications device may be a device capable of receiving and sending data via a network, such as the Internet 134, and can include, for example, a personal computer 130, laptop computer 132, handheld device, palmtop, cellular telephone, or other processor-controlled device that includes instructions for causing the processor to act in accordance with the disclosed methods and systems. The data communications device allows the customer to access a customer record in the MSAP database 118 through a web page associated with a web server 126. The customer can access the web page to select call processing services offered by the LEC.

For example, a customer currently subscribed to a call forwarding service may elect to subscribe to the group notification service. In one embodiment of the disclosed methods and systems, such selection of services can be employed on the web page or other user interface. In one exemplary user interface, menu items can be available for a customer. Accordingly, in such an embodiment, upon the customer's selection of a menu item associated with a group notification service subscription, the web server 126 can display a Group Notification Service registration web page. The registration web page can provide one or more fields to allow the customer to enter, for example, the customer's ten digit telephone number, first and last name, password, one or more alphanumeric messages, and a list or group of destination addresses including, but not limited to, e-mail addresses, instant messaging addresses, pager numbers, and telephone numbers that can be associated with the respective alphanumeric messages. Those of ordinary skill in the art will recognize such customer-entered information is for illustration and not limitation, and other information and/or less information can be used. It should be understood that the devices associated with the pager numbers and telephone numbers can be capable of receiving alphanumeric messages. The alphanumeric message(s) can be associated with the entire list of destination addresses or a subset of the destination addresses entered by the customer during registration. The customer can select a "Submit" button provided on the web page or otherwise cause the information to be transmitted to the SCP and stored in the illustrated MSAP database 118 as part of the customer's customer record 120.

FIG. 2 shows an approach for processing a feature code call in accordance with the disclosed methods and systems. Although the FIG. 2 system and method will be described relative to a system according to FIG. 1, those of ordinary skill in the art will recognize that the FIG. 2 system can be employed with many configurations and is not limited to methods and systems according to FIG. 1. For purposes of this discussion, it can be assumed that *38 is an exemplary valid feature code, and a *38 feature code call is placed at the CPE 110a shown in FIG. 1. When a customer dials *38, the SSP 104b at the switch 104a connected to the CPE 110a can receive data for processing (202). The data can include a string that is processed to determine whether the call is a basic call or a feature code call (204). If the received string does not contain a feature code trigger, the call can be completed without intervention by the SSP 104b (206). If the received string contains a feature code trigger, in this case in the form of a single star ("*"), the SSP 104b can recognize that the string may represent a feature code and launch a query including the received string ("*38") to the SCP 114 for call processing instructions (208).

The SCP 114 can perform a lookup operation or other query using the call processing record 122 to determine whether the received string ("*38") includes a valid and/or recognized feature code (209). If a valid and/or otherwise known feature code is not received, a system and method according to FIG. 2 may terminate the call and/or prompt the customer and/or user to enter a feature code (218). When a valid feature code is provided and/or recognized, the SSP 104b can receive one or more instructions associated with the feature code (210). For example, the feature code represented by *38 can be associated with a group notification service offered by the LEC. The SCP 114 can select an Intelligent Peripheral (IP) 124, 128 to cause the customer to be prompted for identification information (212). The SCP 114 can transmit a send to outside resource (STOR) message to the SSP 104b where the incoming call is being held. The STOR message can identify the IP 124, 128 to which the call is to be directed. For purposes of explanation, it can be understood that the IVR IP 124 can be selected by the SCP 114 to service the incoming call. Accordingly, in response to the STOR message, the SSP 104b can couple the incoming call to the IVR IP 124. The IVR IP 124 can provide the customer with a series of voice prompts for eliciting identification information from the customer. The information obtained from the customer can be forwarded to the SCP 114 for processing.

In the illustrated embodiments, once the customer's identification has been verified by the SCP 114, the SCP 114 can retrieve the customer record 120 associated with the customer, and prompt the customer to select one or more of the pre-stored alphanumeric messages for transmission (214). For example, the customer can be prompted by the IVR IP 124 to press or say "1" to select message 1, press or say "2" to select message 2, etc. The SCP 114 can receive the customer selection and access the destination addresses associated with the selected alphanumeric message from the respective customer record. A group notification message can be transmitted to the destination addresses in the list using one or more internet messaging protocols, such as those in accordance with simple mail transport protocol (SMTP), internet messaging and presence protocol (IMPP), simple network paging protocol (SNPP), Efficient Mail Submit and Delivery (EMSD) protocol, Internet Message Access Protocol (IMAP), Java Messaging Service (JMS), X.400, eXtensible Markup Language (XML), and transmission control protocol/internet protocol (TCP/IP), and/or derivatives and versions thereof, although other internet messaging protocols can be used without departing from the scope of the disclosed methods and systems (216). In one implementation, the SCP 114 can generate a JAVA-based group notification service message and send the group notification service message to the e-mail addresses and/or instant messaging addresses in the list. If the list includes, for example, pager numbers and/or telephone numbers, the SCP 114 can send a STOR message to the SSP 104b to instruct the IP 128, for example, to outdial the appropriate pager numbers and telephone numbers and transmit a group notification service message (216). The group notification service message can additionally and/or optionally include the customer's name, the customer's ten digit telephone number, the time the *38 call was placed, and other data and/or information that can be transmitted based on the embodiment.

In one embodiment, for example, the SCP 114 can transmit an "invoke application" message to the web server 126, where an illustrative invoke application message can be based on Telcordia™ Technologies' SR-3511 or SR-3389 standards to invoke a Java application on the web server 126 that can transmit the emails, instant messages, etc. Those of ordinary skill in the art will recognize the aforementioned example is for illustration and not limitation, and other standards can be used.

What has thus been described are methods and systems that employ internet messaging protocols to transmit an alphanumeric message to one or more destination addresses in response to a telephone service customer's group notification service request. The request can include a string having a feature code trigger and one or more digits. The destination address can be an electronic mail address, an instant messaging address, a pager number, and/or a telephone number.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

The processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, or another device capable of being integrated with a processor(s) that can operate as provided herein. Accordingly, the devices provided herein are not exhaustive and are provided for illustration and not limitation.

Although the methods and systems have been described relative to a specific embodiment thereof, they are not so limited. Obviously many modifications and variations may become apparent in light of the above teachings. For example, references to databases can include data associated in a manner to facilitate the disclosed methods and systems, and can include other data structures that can be stored in contiguous and/or non-contiguous memory that can be accessed internally and/or externally using wired and/or wireless communications.

In one embodiment, the SCP 114 and the web server 126 can be a single server. In an alternative embodiment, once the customer's identification has been verified by the SCP 114, the SCP 114 can retrieve the customer record 120 associated with the customer, and prompt the customer to select a pre-stored alphanumeric message or record a new message for transmission. The customer can enter a new alphanumeric message using a keyboard, stylus, or voice input. Once the alphanumeric message has been recorded, the SCP 114 can prompt the customer to select or otherwise indicate one or more destination addresses to which the message is to be directed. For example, the customer can be prompted by the IVR IP 124 to press, say, select, or otherwise indicate "1" to send the newly recorded message to the e-mail addresses in the list of destination addresses provided during registration (referred to herein as "the registration list"), press, say, select, or otherwise indicate "2" to send the newly recorded message to the instant messaging addresses in the registration list, press, say, select, or otherwise indicate "3" to send the newly recorded message to the pager numbers in the registration list, press, say, select, or otherwise indicate "4" to send the newly recorded message to the telephone numbers in the registration list, press, say, select, or otherwise indicate "5" to select the destination addresses individually from the registration list, press, say, select, or otherwise indicate "6" to send the newly recorded message to the destination addresses associated with pre-stored message 1, press, say, select, or otherwise indicate "7" to send the newly recorded message to the destination addresses associated with pre-stored message 2, etc.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method comprising:
   receiving a request from a telephone service customer, the request including a string having a feature code trigger and one or more digits;
   selecting at least one of a plurality of pre-stored alphanumeric messages based on the request and customer data associated with the request;
   causing to be transmitted the at least one of a plurality of pre-stored alphanumeric messages to at least one destination address using internet messaging protocols, wherein transmitting includes determining that the received string is associated with a group notification service request and wherein the said at least one destination address is an address other than an address from which the said telephone service customer sent the said request;
   receiving the plurality of messages and a plurality of destination addresses from the telephone service customer via a user interface;

associating the messages with the destination address; and
storing the messages and the associated destination addresses as part of the customer data.

2. A method according to claim 1, further comprising:
associating strings with call processing services.

3. A method according to claim 1, wherein the feature code trigger is at least one of a single star (*), double star (**), a pound (#), and a double pound (##).

4. A method according to claim 1, wherein the destination address is at least one of an electronic mail address, an instant messaging address, a pager number, and a telephone number.

5. A method according to claim 1, wherein the internet messaging protocol is at least one of a simple mail transport protocol (SMTP), an internet messaging and presence protocol (IMPP), a simple network paging protocol (SNPP), an Efficient Mail Submit and Delivery (EMSD) protocol, an Internet Message Access Protocol (IMAP), a Java Messaging Service (JMS), X.400, eXtensible Markup Language (XML), a transmission control protocol/internet protocol (TCP/IP), a protocol specified by a Telcordia Technologies SR-3511 standard, and a protocol specified by a Telcordia Technologies SR-3389 standard.

6. A method according to claim 1, wherein the customer data is configured for associating messages with destination addresses.

7. A method according to claim 1, wherein the customer data comprises the alphanumeric messages, the destination addresses, and at least one of a customer identifier, a password, and a list of call processing services to which the customer is subscribed.

8. An apparatus comprising:
a user interface for receiving a request from a telephone service customer, the request including a string having a feature code trigger and one or more digits;
a memory for storing a call processing record which associates feature codes with call processing services of a telephone service, wherein the call processing services include a group notification service; and
a processor for selecting at least one of a plurality of pre-stored alphanumeric messages based on the request and customer data associated with the request;
processing the request and customer data associated with the request and causing to be transmitted at least one of a plurality of pre-stored alphanumeric messages to at least one destination address using internet messaging protocols wherein the said at least one destination address is an address other than an address from which the said telephone service customer sent the said request;
receiving the plurality of messages and a plurality of destination addresses from the telephone service customer via a user interface;
associating the messages with the destination address; and
storing the messages and the associated destination addresses as part of the customer data.

9. The apparatus of claim 8, further comprising:
a memory for storing customer data on a plurality of telephone service customers, wherein the customer data comprises the plurality of pre-stored alphanumeric messages, the at least one destination address and at least one of a customer identifier, a password, and a list of call processing services to which the customer is subscribed.

10. A service switching point (SSP) in a communications system comprising:
means for receiving a request from a telephone service customer, the request including a string having a feature code trigger and one or more digits;
means for communicating the customer request to a service control point (SCP);
means for receiving instructions from the service control point (SCP), wherein the instructions include a selection of at least one of a plurality of alphanumeric messages that is selected based on the request and customer data associated with the request;
means for storing a call processing record which associates feature codes with call processing services of a telephone service, wherein the call processing services include a group notification service;
means for transmitting at least one of a plurality of alphanumeric messages to at least one destination address based on the instructions received from the service control point (SCP), wherein the said at least one destination address is an address other than an address from which the said telephone service customer sent the said request;
receiving the plurality of messages and a plurality of destination addresses from the telephone service customer via a user interface;
associating the messages with the destination address; and
storing the messages and the associated destination addresses as part of the customer data.

11. A service control point (SCP) in a communications system integrated with a telephone network comprising:
means for receiving data from a service switching point (SSP);
means for processing the data to determine whether the data includes a group notification service request;
means for selecting at least one of a plurality of pre-stored alphanumeric messages based on the request and customer data associated with the request;
means for causing to be transmitted at least one of a plurality of pre-stored alphanumeric messages to at least one destination address using internet messaging protocols based on the group notification service request and the customer data, wherein the said at least one destination address is an address other than an address from which the said group notification service request was sent;
receiving the plurality of messages and a plurality of destination addresses from the telephone service customer via a user interface;
associating the messages with the destination address; and
storing the messages and the associated destination addresses as part of the customer data.

12. The service control point of claim 11, further comprising:
means for storing customer data on a plurality of telephone service customers;
wherein the customer data comprises the plurality of pre-stored alphanumeric messages, the at least one destination address and at least one of a customer identifier, a password, and a list of call processing services to which the customer is subscribed.

13. A computer program product disposed on a computer readable medium and having instructions for causing a processor to:
receive a request from a telephone service customer, the request including a string having a feature code trigger and one or more digits;
determine that the received string is associated with a group notification service request;
select at least one of a plurality of pre-stored alphanumeric messages based on the request and customer data associated with the request;

cause to be transmitted the at least one of a plurality of pre-stored alphanumeric messages to at least one destination address using internet messaging protocols, wherein the said at least one destination address is an address other than an address from which the said telephone service customer sent the said request;

receive the plurality of messages and a plurality of destination addresses from the telephone service customer via a user interface;

associate the messages with the destination address; and store the messages and the associated destination addresses as part of the customer data.

14. A product according to claim 13, further comprising instructions for causing a processor to:

associate strings with call processing services.

15. A product according to claim 13, further comprising instructions for causing a processor to:

associate messages with destination addresses.

16. A product according to claim 13, wherein the instructions to transmit include instructions to transmit using at least one of a simple mail transport protocol (SMTP), an internet messaging and presence protocol (IMPP), a simple network paging protocol (SNPP), an Efficient Mail Submit and Delivery (EMSD) protocol, an Internet Message Access Protocol (IMAP), a Java Messaging Service (JMS), X.400, eXtensible Markup Language (XML), a transmission control protocol/internet protocol (TCP/IP), a protocol specified by a Telcordia Technologies SR-3511 standard, and a protocol specified by a Telcordia Technologies SR-3389 standard.

* * * * *